United States Patent
Pae et al.

(10) Patent No.: US 7,254,098 B2
(45) Date of Patent: Aug. 7, 2007

(54) CD-DVD COMPATIBLE OPTICAL PICKUP AND OPTICAL RECORDING AND/OR REPRODUCING APPARATUS USING THE SAME

(75) Inventors: Jung-gug Pae, Gyeonggi-do (KR);
Bong-gi Kim, Gyeonggi-do (KR);
Chun-seong Park, Gyeonggi-do (KR);
Soo-han Park, Gyeonggi-do (KR);
Moon-whan Lee, Gyeonggi-do (KR);
Do-whan Nam, Gyeonggi-do (KR);
Seong-su Park, Gyeonggi-do (KR);
Jung-woo Hong, Gyeonggi-do (KR);
Tae-youn Heor, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 10/677,731

(22) Filed: Oct. 3, 2003

(65) Prior Publication Data
US 2004/0120229 A1   Jun. 24, 2004

(30) Foreign Application Priority Data
Oct. 25, 2002   (KR) ............... 10-2002-0065518

(51) Int. Cl.
*G11B 7/00* (2006.01)
(52) U.S. Cl. .................. 369/44.16; 369/44.11
(58) Field of Classification Search ........ 369/44.16
See application file for complete search history.

(56) References Cited

U.S. PATENT DOCUMENTS

| | | | | |
|---|---|---|---|---|
| 5,467,328 | A * | 11/1995 | Murakami et al. | 369/44.16 |
| 6,160,771 | A * | 12/2000 | Kawano et al. | 369/44.15 |
| 6,570,828 | B2 * | 5/2003 | Kikuchi et al. | 369/44.32 |
| 7,113,351 | B2 * | 9/2006 | Hovanky | 359/824 |
| 2001/0019519 | A1 * | 9/2001 | Suzuki et al. | 369/44.16 |
| 2002/0021651 | A1 * | 2/2002 | Hong et al. | 369/112.23 |
| 2003/0198148 | A1 * | 10/2003 | Choi | 369/44.16 |
| 2004/0017764 | A1 * | 1/2004 | Suzuki et al. | 369/244 |

FOREIGN PATENT DOCUMENTS

JP   64-52233   2/1989

(Continued)

*Primary Examiner*—Wayne Young
*Assistant Examiner*—Linh T. Nguyen
(74) *Attorney, Agent, or Firm*—Staas & Halsey LLP

(57) ABSTRACT

A CD-DVD compatible optical pickup in which both on-axis and off-axis light form a circular light spot on a recording surface of an optical recording medium, and an optical recording and/or reproducing apparatus using the same. The CD-DVD compatible optical pickup includes an optical output module, an objective lens, an optical path conversion unit, a photodetector, and an actuator. The optical output module has a mount and light sources emitting light of different wavelengths. The objective lens focuses the emitted light onto two types of optical recording media. The optical path conversion unit between the optical output module and objective lens, converts incident light. The photodetector receives beams emitted from the light sources, reflected from the optical recording media, and then passed through the optical path conversion unit, detecting data and error signals. The actuator has a movable member, moving the objective lens and compensating focusing and tracking error signals.

27 Claims, 12 Drawing Sheets

FOREIGN PATENT DOCUMENTS

| | | |
|---|---|---|
| JP | 11-73661 | 3/1999 |
| JP | 2001-93178 | 4/2001 |
| JP | 2002-83434 | 3/2002 |
| JP | 2002083434 A * | 3/2002 |
| JP | 2002-304764 | 10/2002 |
| WO | WO 02/080157 | 10/2002 |

* cited by examiner

47(48)

47(48)

CD-DVD COMPATIBLE OPTICAL PICKUP AND OPTICAL RECORDING AND/OR REPRODUCING APPARATUS USING THE SAME

CROSS-REFERENCE TO RELATED APPLICATIONS

This application claims the benefit of Korean Patent Application No. 2002-65518, filed on Oct. 25, 2002, in the Korean Intellectual Property Office, the disclosure of which is incorporated herein by reference.

BACKGROUND OF THE INVENTION

1. Field of the Invention

The present invention relates to a CD-DVD compatible optical pickup using a twin laser diode emitting light of two different wavelengths and an optical recording and/or reproducing apparatus using the same, and more particularly, to a CD-DVD compatible optical pickup in which both on-axis light and off-axis light form a circular light spot on an optical recording medium and an optical recording and/or reproducing apparatus using the same.

2. Description of the Related Art

Generally, optical pickups are used in compact disc players (CDPs), CD-random access memory (ROM) drives, digital versatile disc players (DVDPs), DVD-ROM drives, etc. and perform data recording and/or reproduction on recording media in a non-contact manner.

An optical pickup used for the DVD-family recording media, such as a DVD or a DVD-ROM, should be compatible with that used for the CD-family recording media, such as a CD, a CD-R, a CD-RW, a CD-I, or a CD-G, to perform data recording and/or reproduction on two kinds of the recording media.

However, a standard thickness of a DVD is different from that of a CD due to an allowable tolerance of tilt of a disc and numerical aperture (NA) of an objective lens, etc. That is, the thickness between an incident surface and an information recording surface in a conventional CD-family recording media is 1.2 mm, whereas a thickness in a DVD is 0.6 mm. Thus, if an optical pickup for the DVD is used for the conventional CD-family recording media, spherical aberration is generated due to a thickness difference between the conventional CD-family recording media and the DVD. As such, sufficient optical intensity required for recording a data signal cannot be obtained, and a reproduction signal is deteriorated due to the spherical aberration.

Further, light sources for DVD and conventional CD family recording media reproduction have different standard wavelengths. That is, the wavelength of the light source for conventional CD-family recording media reproduction is about 780 nm, whereas the wavelength of the light source for DVD reproduction is about 650 nm.

Since a conventional CDP cannot reproduce data recorded on the DVD due to the above-described differences, a separate optical pickup for a DVD is required. Here, the separate optical pickup for the DVD must be compatible with that for the conventional CD-family recording media.

Considering the above-described problems, a CD-DVD compatible optical pickup as shown in FIG. 1 includes an optical output module 10 in which first and second light sources 11 and 13 are integrally formed, an objective lens 7 focusing light emitted from the first and second light sources 11 and 13 onto an optical recording medium 1, a beam splitter 5 converting a traveling path of incident light, and a photodetector 9 which receives light reflected from the optical recording medium 1 and then passed through the beam splitter 5.

The CD-DVD compatible optical pickup further includes a grating 3, a collimating lens 6, and an astigmatism lens 8.

The grating 3 is installed on an optical path between the optical output module 10 and the beam splitter 5 and diffracts and transmits the incident light. The collimating lens 6, disposed on an optical path between the beam splitter 5 and the objective lens 7, converges the incident light, and focuses light directed toward the objective lens 7 into parallel light. The astigmatism lens 8 is disposed on an optical path between the beam splitter 5 and the photodetector 9, and is inclined in a direction opposite to a direction in which the beam splitter 5 is inclined. The astigmatism lens 8 suppresses coma aberration and generates astigmatism in order to detect an error signal using an astigmatic method.

The objective lens 7 is mounted in a moving member (not shown) on an actuator 20. The actuator 20 drives the objective lens 7 in a tracking direction (direction along a X-axis in FIG. 1) of the optical recording medium 1 and a focusing direction (direction along a Y-axis in FIG. 1) based on a tracking error signal and a focusing error signal detected by the photodetector 9.

Referring to FIGS. 2 and 3, the optical output module 10 further includes a monitor photodetector 17 for monitoring an optical output of the first and second light sources 11 and 13 which emit light of two different wavelengths.

The first light source 11, emitting a first light beam 11a having the wavelength of about 650 nm, is employed in a case where a thin optical disc 1a (refer to FIG. 4), a thickness between an incident surface and a recording surface is relatively thin, is used as the optical recording medium 1. The second light source 13, emitting a second light beam 13a having the wavelength of about 780 nm, is employed in a case where a thick optical disc 1b (refer to FIG. 4), a thickness between an incident surface and a recording surface is relatively thick, is used as the optical recording medium 1. The second light source 13 is used in, for example, an optical pickup for a CD utilizing a relative long wavelength.

The first and second light sources 11 and 13 are a twin laser diode and are installed on a mount 15 in a single chip shape. Further, the first and second light sources 11 and 13 are separately installed by grooves 12 so as to irradiate light of two different wavelengths. In the optical output module 10 having the above-described structure, the distance between an emitting point of the first light source 11 and an emitting point of the second light source 13 is optically about 110 μm. Thus, in a case where the optical elements are disposed such that a center of the first light beam 11a emitted from the first light source 11 travels along the optical axis of the light as indicated by the solid lines in FIG. 1, the second light beam 13a emitted from the second light source 13 deviates from the optical axis of the light as indicated by the dotted lines in FIG. 1.

FIG. 4 shows that the first and second light beams 11a and 13a emitted from the first and second light sources 11 and 13 pass through the objective lens 7 and then are focused onto the optical recording medium 1. As shown in FIG. 4, since the first light beam 11a traveling along the optical axis has an optical profile symmetric with respect to the optical axis, the first light beam 11a is incident on the incident surface of the optical recording medium 1 at substantially a right angle. On the other hand, since the second light 13a travels asymmetrically with respect to the optical axis, the second light beam 13a is incident on the incident surface of the optical recording medium 1 at a predetermined angle other than substantially a right angle.

Thus, as shown in FIG. 5A, the first light beam 11a preferably forms a circular light spot SP1 on a thin optical disc 1a. However, as shown in FIG. 5B, the second light beam 13a forms a light spot SP2 of a distorted shape on a thick optical disc 1b. As a result, optical aberration and jitter increase in the light spot SP2 formed by the second light beam 13a so that the signal reproduction performance of an optical recording and/or reproducing apparatus using the optical pickup is reduced.

SUMMARY OF THE INVENTION

The present invention provides a CD-DVD compatible optical pickup having an off-axis light beam emitted from a light source forming a substantially circular light spot on an optical recording medium, using a twin laser diode as the light source, and an optical recording and/or reproducing apparatus using the same.

According to an aspect of the present invention, a CD-DVD compatible optical pickup is provided comprising an optical output module having a mount and first and second light sources disposed so as to be adjacent to each other on the mount and emitting light beams having different wavelengths, an objective lens focusing light, emitted from the first and second light sources, onto two types of optical recording media, and an optical path conversion unit disposed on an optical path between the optical output module and the objective lens converting a traveling path of incident light. A photodetector receives the light beams emitted from the first and second light sources, reflected from the optical recording media, and passed through the optical path conversion unit, and detects a data signal and an error signal. An actuator, having a moving member in which the objective lens is mounted, moves the objective lens in a direction capable of compensating for a focusing error signal and a tracking error signal. The actuator rolls the moving member, in a case where recording and/or reproduction of data is performed using a light beam deviating from a main axis of the objective lens among the light beams emitted from the first and second light sources.

The actuator includes a base on which the optical output module, the optical path conversion unit, and the photodetector are installed. A holder is installed on the base, and a plurality of elastic members respectively have one end coupled to the holder and the other end coupled to the moving member such that the moving member is supported movably, and have different stiffnesses with respect to the center of the objective lens such that the moving, member asymmetrically moves in a focusing direction of the optical recording media. A magnetic driving unit drives the moving member in the focusing direction and the tracking direction of the optical recording media due to an electromagnetic force of the magnetic driving unit.

According to one aspect of the present invention, the length of the elastic member positioned close to an inner circumference of the optical recording media with respect to the radius direction of the optical recording medium is different from that of the elastic member positioned close to an outer circumference of the optical recording medium such that the moving member asymmetrically moves in a focusing direction of the optical recording media. A magnetic driving unit drives the moving member in the focusing direction and a tracking direction of the optical recording media due to an interaction between the magnet and a current flowing in the focusing coils and an interaction between the magnet and a current flowing in the tracking coils.

According to another aspect of the present invention, the optical recording and/or reproducing apparatus includes a spindle motor rotating an optical recording medium placed in a turntable, an optical pickup mounted so as to be movable in a radius direction of the optical recording medium and perform recording and reproduction of data with respect to the optical recording medium, a driving unit driving the spindle motor and the optical pickup and a controller controlling a focusing servo and a tracking servo of the optical pickup. The optical pickup includes an optical output module having a mount and first and second light sources, disposed so as to be adjacent to each other on the mount and emit light beams having different wavelengths, an objective lens focusing light emitted from the first and second light sources onto two types of optical recording media and an optical path conversion unit disposed on an optical path between the optical output module and the objective lens converting a traveling path of incident light. A photodetector receives the light beams, emitted from the first and second light sources, reflected from the optical recording media, and then passed through the optical path conversion unit, and detects a data signal and an error signal. An actuator, having a moving member in which the objective lens is installed, moves the objective lens in a direction capable of compensating a focusing error signal and a tracking error signal, and rolling the moving member in a case where recording and/or reproduction of data is performed using a light beam deviating from a main axis of the objective lens among the light beams emitted from the first and second light sources.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the embodiments taken in conjunction with accompanying drawings in which.

DETAILED DESCRIPTION OF THE INVENTION

Figure 1:
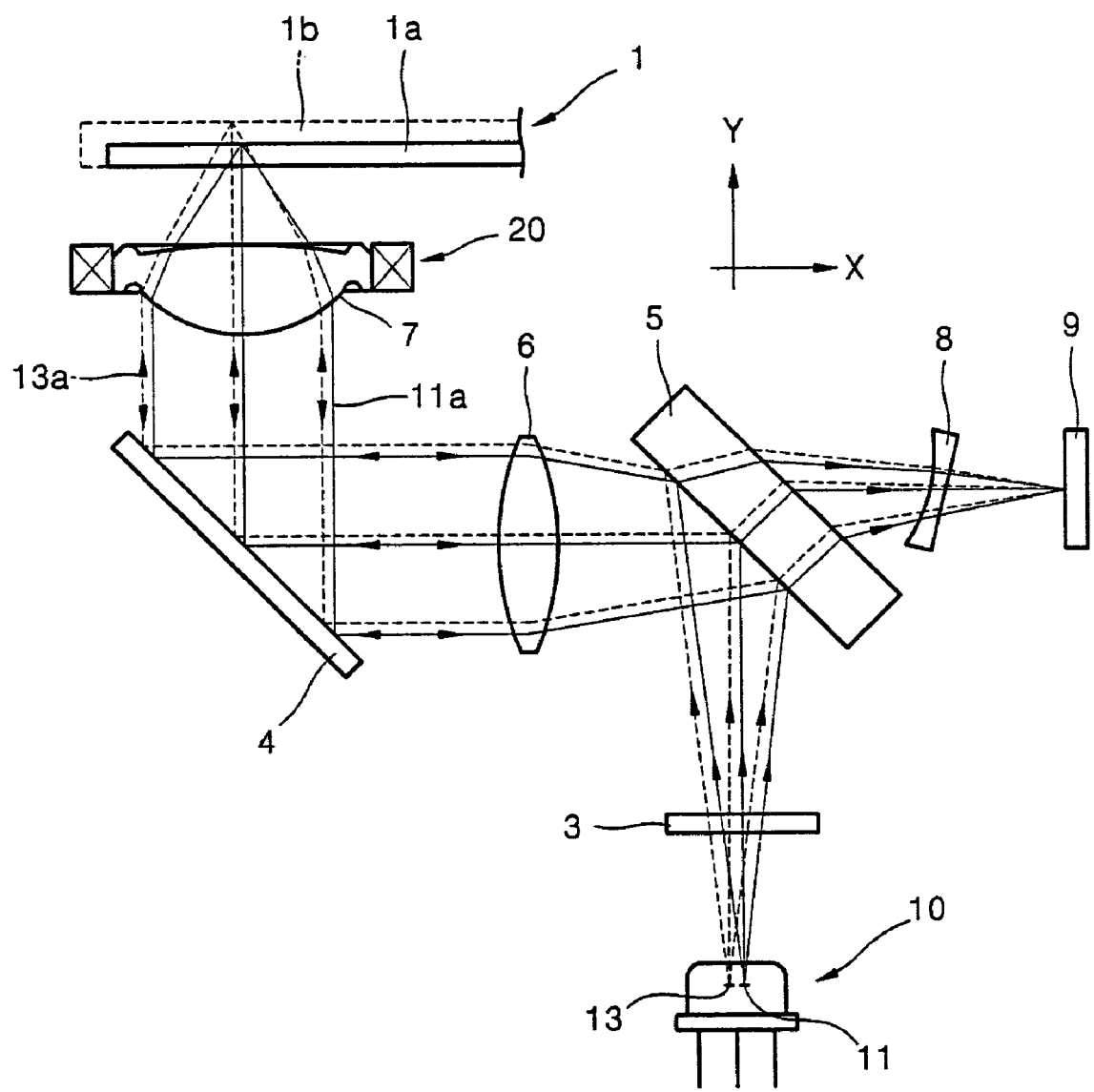
FIG. 1 shows the disposition of optical elements of a CD-DVD compatible optical pickup using a twin laser diode.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
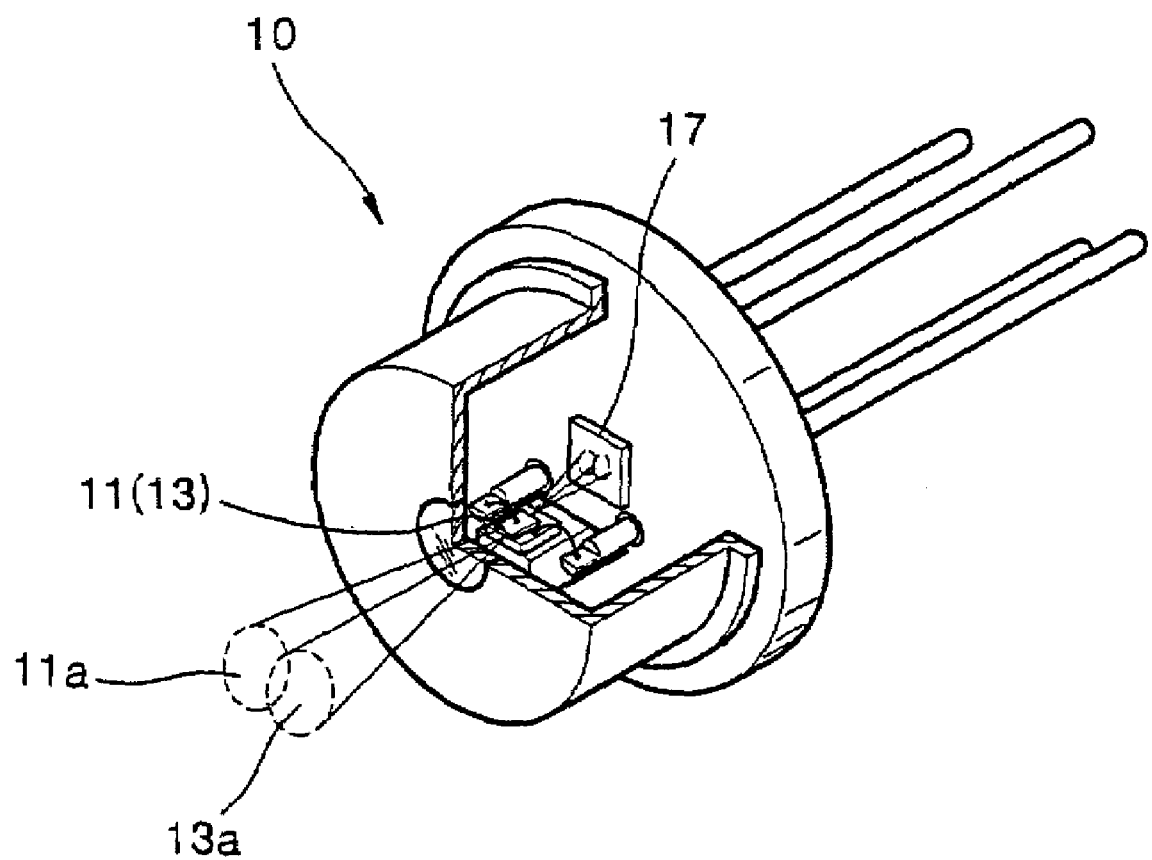
FIG. 2 is a perspective cut-away view of an optical output module of FIG. 1.
Figure 3:
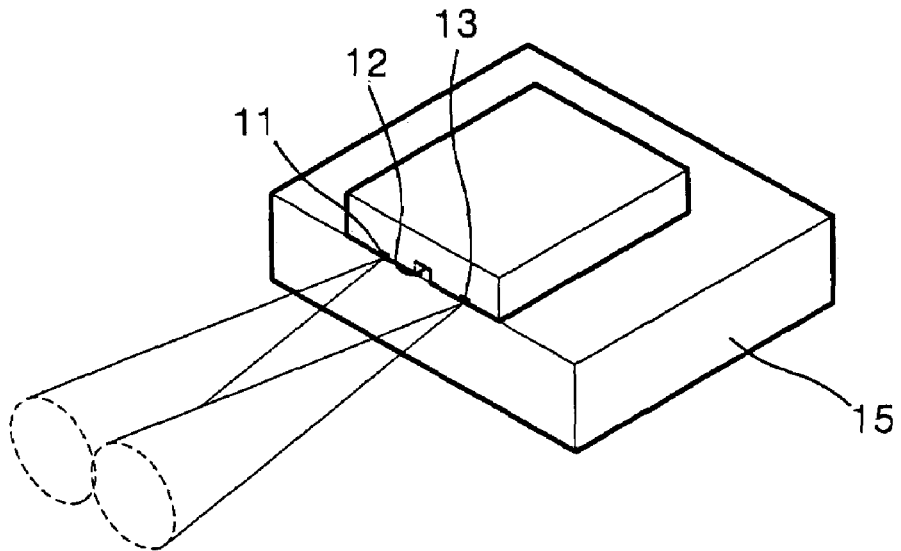
FIG. 3 is an enlarged perspective view of first and second light sources of FIG. 1.
Figure 4:
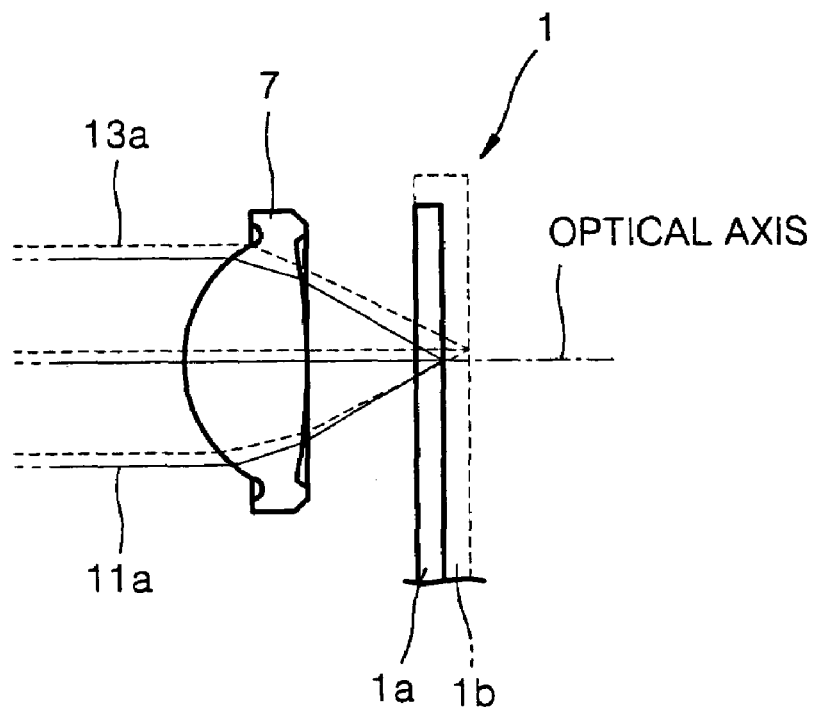
FIG. 4 schematically shows an optical path of light beams emitted from the first and second light sources of FIG. 1 passing through an objective lens and focused onto an optical recording medium.
Figure 5A:
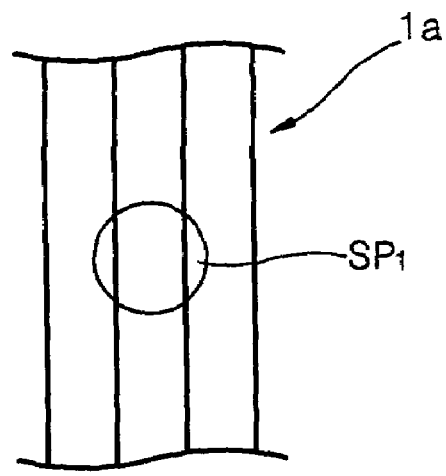
FIGS. 5A and 5B schematically show shapes of light spots, which the light beams emitted from the first and second light sources of FIG. 1, form on the optical recording medium.
Figure 5B:
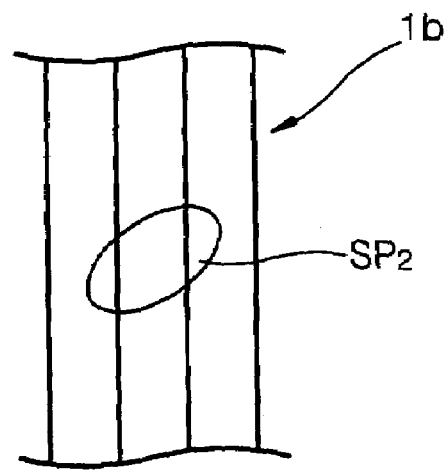

A CD-DVD compatible optical pickup according to an aspect of the present invention includes some similar optical elements as those of a conventional CD-DVD compatible optical pickup shown in FIGS. 1 through 3. However, in the CD-DVD compatible optical pickup according to the present invention, the optical pickup actuator is improved in order to solve the above-described problems of the conventional CD-DVD compatible optical pickup. Description of the CD-DVD compatible optical pickup according to the present invention will include references to some components of FIGS. 1 through 3 which also show some components of the conventional CD-DVD compatible optical pickup.

The CD-DVD compatible optical pickup according to an aspect of the present invention includes an optical output module 10 having first and second light sources 11 and 13, an objective lens 7 focusing light emitted from the first and second light sources 11 and 13 onto two different optical recording media 1a and 1b, an optical path conversion unit converting a traveling path of incident light, and a photodetector 9 receiving light reflected from an optical recording medium 1.

The optical output module 10 includes a mount 15 in which the first and second light sources 11 and 13 are mounted, and a monitor photodetector 17 receiving and monitoring a portion of the light emitted from the first and second light sources 11 and 13.

An optical path conversion unit is disposed on an optical path of the optical output module 10, the objective lens 7, and the photodetector 9 so that the light emitted from the optical output module 10 is directed toward the optical recording medium 1 and the light reflected from the optical recording medium 1 is directed toward the photodetector 9. A plate-type beam splitter 5, disposed to be inclined on the optical path, can be used as the optical path conversion unit. Further, it is possible to use a cubic beam splitter, a polarizing beam splitter, a hologram optical element, etc. as the optical path conversion unit.

In a case where the thick optical disc 1b, in which a thickness between an incident surface and a recording surface is relatively thick, is used as the optical recording medium 1, the CD-DVD compatible optical pickup further includes a grating 3 disposed on an optical path between the optical output module 10 and the plate-type beam splitter 5. The grating 3 diffracts and transmits the light emitted from the optical output module 10 into a 0-order light beam, ±1-order light beam, etc., in order to detect a tracking error signal using a three-light beam method. On the other hand, in a case where the thin optical disc 1a in which a thickness is relatively thin is used, the tracking error signal is detected by a differential phase detection method. A second light beam 13a emitted from the second light source 13 is incident on the thick optical disc 1b, and a first light beam 11a emitted from the first light source 11 is incident on the thin optical disc 1a.

A mirror 4 and a collimating lens 6, focusing the diverging light into parallel light are disposed on an optical path between the plate-type beam splitter 5 and the objective lens 7. The mirror 4 reflects the light so the reflected light is perpendicular to the optical recording medium 1 even where the optical elements are disposed in a horizontal direction, thereby reducing the height of the optical elements.

The photodetector 9 receives the light, emitted from the first and second light sources 11 and 13 and reflected from the optical recording medium 1, and detects a data signal and a servo signal. The CD-DVD compatible optical pickup, according to an aspect of the present invention, includes an astigmatism lens 8, disposed on an optical path between the plate-type beam splitter 5 and the photodetector 9, detecting a focusing error signal using an astigmatic method. The astigmatism lens 8 is inclined in a direction opposite to a direction in which the plate-type beam splitter 5 is inclined, correcting for coma aberration generated due to the inclination disposition of the plate-type beam splitter 5.

An actuator 40 includes a moving member 45 (refer to FIG. 6), in which the objective lens 7 is mounted, driving the objective lens 7 in a direction to compensate for the tracking error signal and the focusing error signal.

Figure 6:
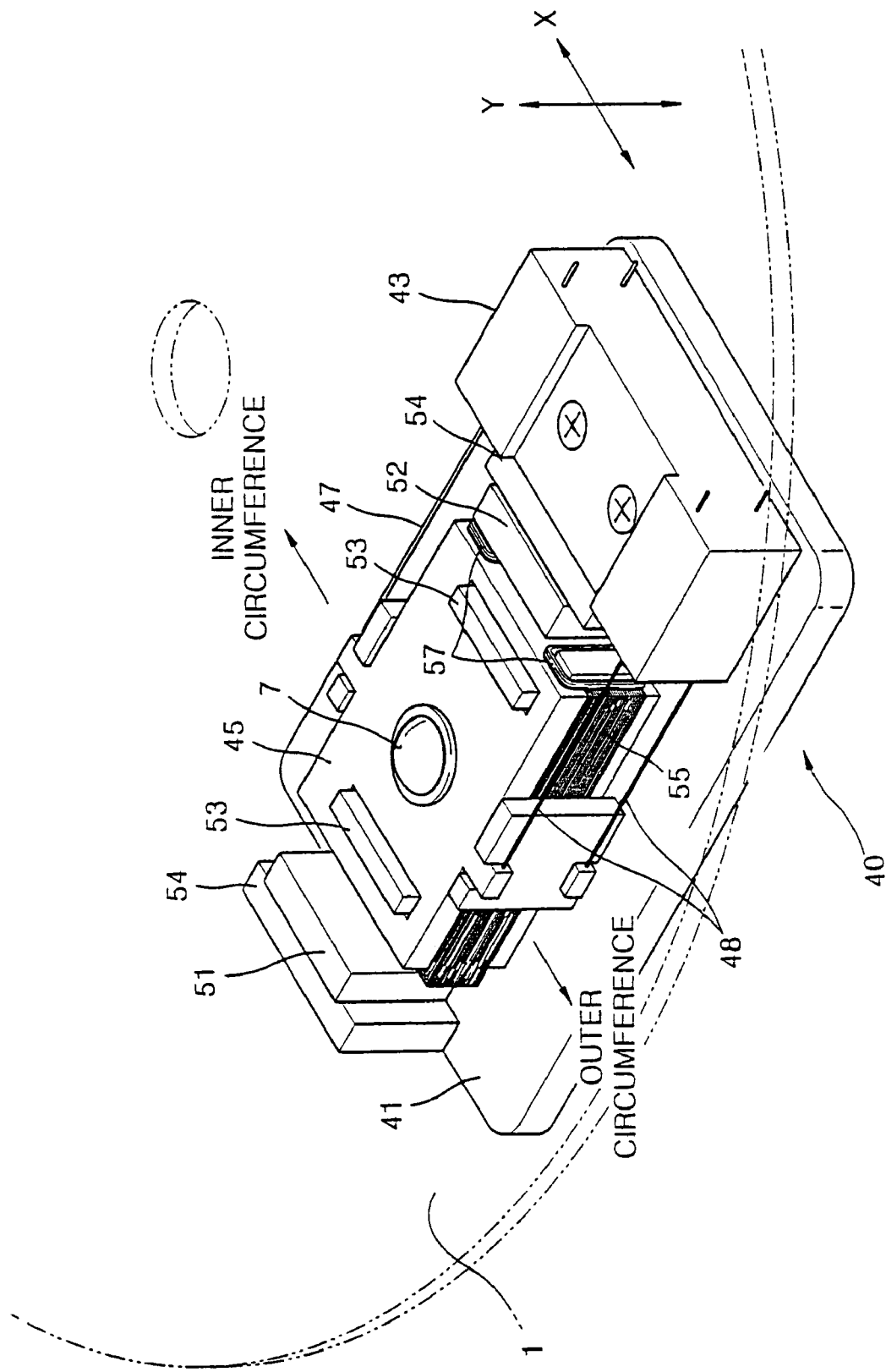
FIG. 6 is a schematic perspective view of an actuator of a CD-DVD compatible optical pickup according to an embodiment of the present invention.

Referring to FIG. 6, the actuator 40 according to an embodiment of the present invention includes a base 41, a holder 43 installed on the base 41, and a moving member 45 in which the objective lens 7 is mounted. A plurality of elastic members 47 and 48 respectively have one end coupled to the holder 43 and the other end coupled to the moving member 45 such that the moving member 45 is supported movably. A magnetic driving unit (not shown) drives the moving member 45 in a focusing direction (direction along a Y-axis in FIG. 6) and a tracking direction (direction along a X-axis in FIG. 6) of the optical recording medium 1.

The magnetic driving unit includes magnets 51 and 52 positioned opposite to each other, with the moving member 45 interposed therebetween, an internal yoke 53 and an external yoke 54 installed inside and outside respectively the magnets 51 and 52 on the base 41 and guiding the formation of a magnetic path, focusing coils 55 wound around the outside of the moving member 45, and tracking coils 57 wound at sidewalls of the moving member 45 positioned opposite to the magnet 51.

The plurality of elastic members 47 and 48 include the first elastic member 47 positioned nearer an inner circumference, than an outer circumference, of the optical recording medium 1 with respect to the radius direction of the optical recording medium 1, and the second elastic member 48 positioned nearer an outer circumference, than an inner circumference, of the optical recording medium 1.

The first and second elastic members 47 and 48 have different stiffnesses with respect to the center of the objective lens 7 such that the moving member 45 asymmetrically moves in the focusing direction Y. The stiffness of the second elastic member 48 is relatively less than that of the first second elastic member 47. This difference in stiffness between the first and second elastic members 47 and 48 may be achieved by making the thickness of the second elastic member 48 thinner that of the first elastic member 47.

The actuator 40, having the above-described structure, drives the moving member 45 in the focusing direction Y according to the focusing error signal, normally input, without the rolling of the moving member 45, in a case of using the first light beam 11a, the on-axis light. On the other hand, in a case of using the second light beam 13a, the off-axis light, a substantially circular light spot is formed on the optical recording medium 1b due to the rolling of the moving member 45.

The determination of whether the moving member 45 is rolled is achieved by a difference in working distances between the two kinds of optical recording media used, the electromagnetic force of the magnetic driving unit, and a distance in elastic force between the first and second elastic members 47 and 48.

Figure 7:
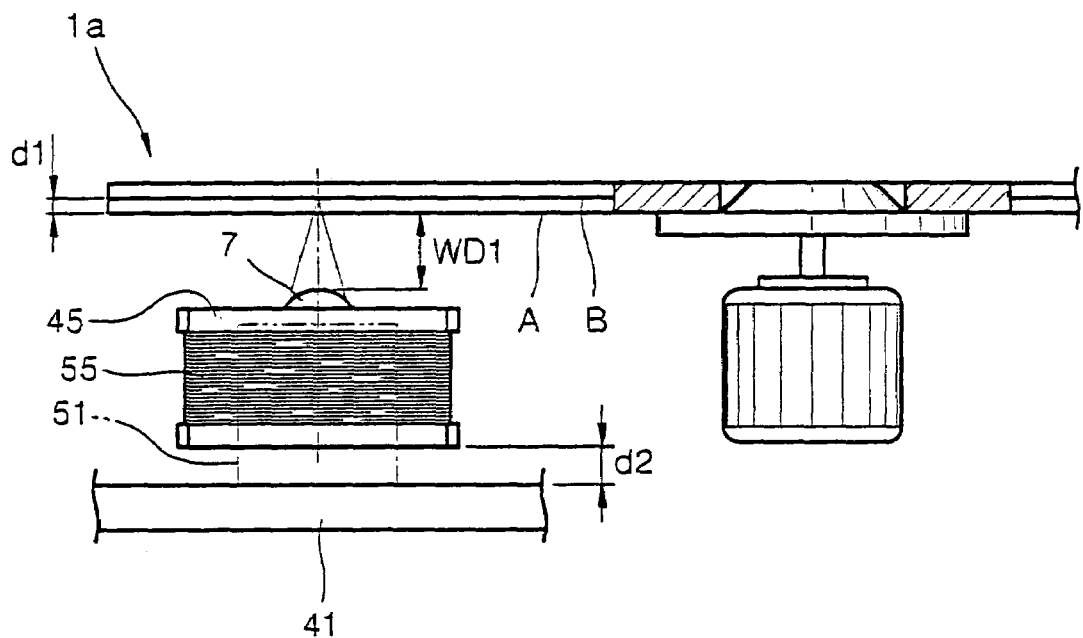
FIGS. 7 and 8 illustrate positions of the actuator of FIG. 6 during operation.
Figure 8:
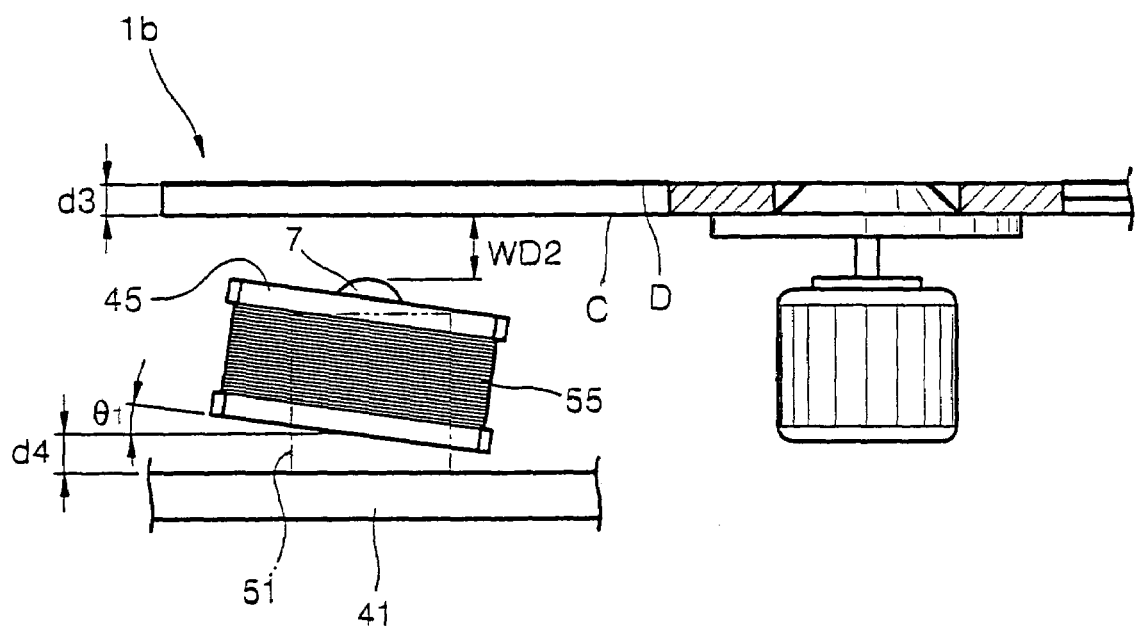

Referring to FIGS. 7 and 8, the working distance is referred to as a distance between the objective lens 7 and optical incident surfaces A and C of the optical recording media 1a and 1b.

In FIG. 7, the optical recording medium 1a, a thickness d1 between a data recording surface B and the optical incident surface A is relatively thin. In FIG. 8, the optical recording medium 1b, a thickness d3 between a data recording surface D and the optical incident surface C is relatively thicker than the thickness d1 of the optical recording medium 1a. The optical recording medium 1a of FIG. 7 is an example of a digital versatile disc (DVD) having a thickness d1 of 0.6 mm, and the optical recording medium 1b of FIG. 8 is an example of a compact disc (CD) having a thickness d3 of 1.2 mm.

In a case where an objective lens 7 is used such as a T565 model product manufactured by KONICA CO., LTD., a working distance WD1 in FIG. 7 is 1.71 mm whereas a working distance WD2 in FIG. 8 is 1.35 mm and longer than the working distance WD1 in FIG. 7. Thus, when distances d2 and d4 of FIGS. 7 and 8 between the base 41, which does not move in a focusing direction, and the moving member 45, which can move, as shown in FIG. 8, are compared, the distance d2 in FIG. 7 is shorter than the distance d4 in FIG. 8.

Thus, in a case where the intensity of current applied to the focusing coils 55 is substantially the same in FIGS. 7 and 8, the intensity of an electromagnetic force between the focusing coils 55 and the magnet 51, indicated by a dotted line, in FIG. 7 is stronger than the intensity of an electromagnetic force in FIG. 8. That is, because, a facing area of the focusing coils 55 and the magnet 51 in FIG. 7 is greater than that in FIG. 8.

Therefore, in FIG. 7, the difference in stiffness between the first and second elastic members 47 and 48 is overcome due to the stronger electromagnetic force than that in FIG. 8, thereby suppressing the rolling of the moving member 45.

Figure 9:
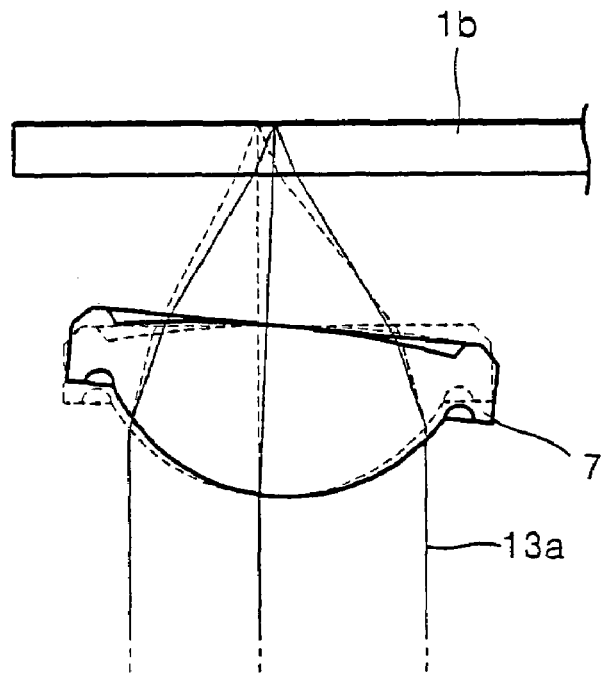
FIG. 9 illustrates the correction of an optical path of an off-axis light beam by the actuator of FIG. 6.
Figure 10:
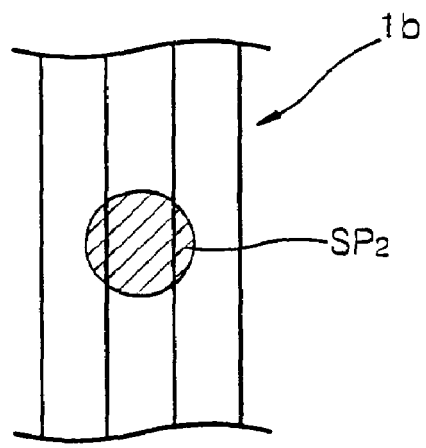
FIG. 10 shows a shape of a light spot which the off-axis light beam shown in FIG. 9 emitted from a second light source forms on an optical recording medium.

Since the electromagnetic force in FIG. 8 is weaker than that in FIG. 7, the moving member 45 is rolled due to the difference in stiffness between the first and second elastic members 47 and 48. In a case where the second light beam 13a is focused onto the optical recording medium 1b, in a state of the rolling of the moving member 45, as shown in FIG. 9, due to the inclination disposition of the objective lens 7, the travelling path of the second light beam 13a, directed toward the optical recording medium 1b through the objective lens 7, changes from an optical path indicated by a dotted line into an optical path indicated by a solid line. Thus, as shown in FIG. 10, a substantially circular light spot is formed on the optical recording medium 1b.

The present invention is not limited to the description of the light for the CD as off-axis light. The present invention can be applied to an optical pickup in which light for the CD is referred to as on-axis light and light for the DVD is referred to as off-axis light.

Example coefficients for making the stiffnesses of the first and second elastic members 47 and 48 different can be found as follows.

The following Equation 1 indicates the electromagnetic force generated between the focusing coils 55 and the magnets 51 and 52.

$$F = niIB \tag{1}$$

In Equation 1, n represents the number of turns of the focusing coils 55, i represents current, l represents the effective length of the elastic members 47 and 48, and B represents a magnetic field.

The following Equation 2 indicates the elastic force generated in the elastic members 47 and 48.

$$F = kx \tag{2}$$

In Equation 2, k represents an elastic coefficient of the elastic members 47 and 48 and x represents the deformation amount of the elastic members 47 and 48.

The following Equation 3 indicates a deformation amount of the elastic members 47 and 48 in a case where the electromagnetic force obtained by Equation 1 is the same as the elastic force obtained by Equation 2.

$$x = \frac{niIB}{k} \tag{3}$$

Figure 11:
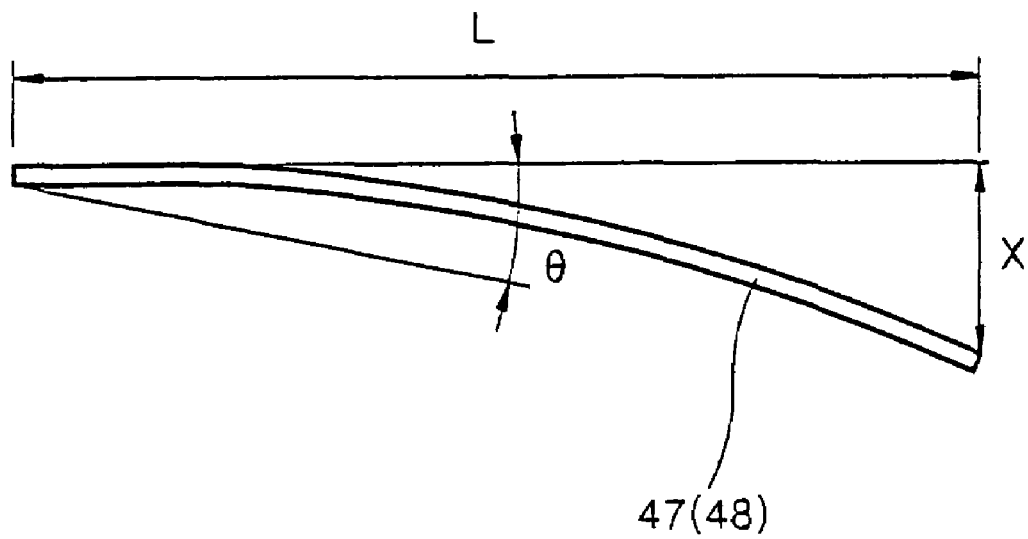
FIGS. 11 and 12 schematically show examples of deformed elastic members.

FIG. 11 shows an example of the deformation of the elastic members 47 and 48. An elastic coefficient k used in FIG. 11 is given by the following Equation 4.

$$k = \frac{12E\pi d^4}{L^3 64} \tag{4}$$

In Equation 4, L represents the length of the elastic members 47 and 48, E represents Young's modulus, and d represents the diameter of the elastic members 47 and 48.

Figure 12:

FIG. 12 shows another example of the deformation of the elastic members 47 and 48. An elastic coefficient k used in FIG. 12 is given by the following Equation 5.

$$k = \frac{3E\pi d^4}{L^3 64} \tag{5}$$

An angle θ generated due to the deformation of the elastic members 47 and 48 is given by the following Equation 6.

$$\tan \theta = x/L \ldots \tag{6}$$

The following Equation 7 indicates an angle θ1 (refer to FIG. 8) of inclination of the moving member 45 generated due to the difference in thickness between the first and second elastic members 47 and 48. Further, the angle θ1 of inclination changes according to change in the elastic coefficient caused by the difference in length or material between the first and second elastic members 47 and 48 as well as the difference in thickness.

$$\sin\theta 1 = \frac{x2 - x1}{L} \quad (7)$$

In Equation 7, x1 represents a deformation length of the first elastic member 47 and x2 represents a deformation length of the second elastic member 48.

The amount of change in the rolling of the moving member 45 can be obtained as follows.

Figure 13:
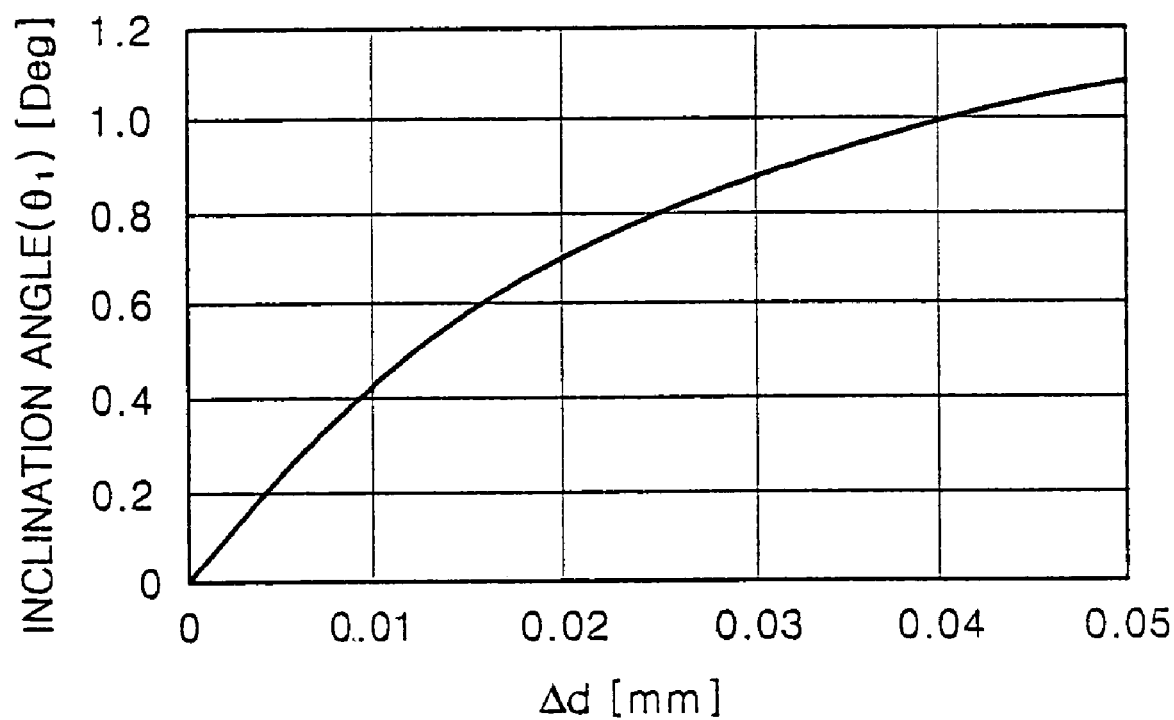
FIG. 13 is a graph showing variation in inclination angles due to thickness differences between the elastic members, in the case where the elastic members are deformed as shown in FIG. 11.

FIG. 13 shows variations of the angle θ1 of inclination of the moving member 45 according to the difference Δd in diameter between the elastic members 47 and 48 based on example data in Table 1. In this example, the angle θ1 of inclination of the moving member 45 indicates that the elastic members 47 and 48 have the deformation shown in FIG. 11. The elastic coefficient k used in the angle θ1 of inclination is given by Equation 4.

TABLE 1

| | |
|---|---|
| The number of turning of coils (n) | 53 (turns) |
| Magnetic field (B) | 0.2 (T) |
| Effective length of elastic members (L) | 0.011 (m) |
| Current (I) | 0.01 (A) |
| Young's Modulus (E) | $1.10 \times 10^{11}$ (N/m$^2$) |
| Diameter of first elastic member (d1) | 0.1 (mm) |
| Diameter of second elastic member (d2) | 0.1–0.15 (mm) {d2 is changed in units of 0.02 mm} |

As described above, since the angle θ1 of inclination of the moving member 45 is dependent on the different thicknesses of the elastic members 47 and 48 from each other so that the light spot of the off-axis light beam is formed into a substantially circular shape.

Figure 14:
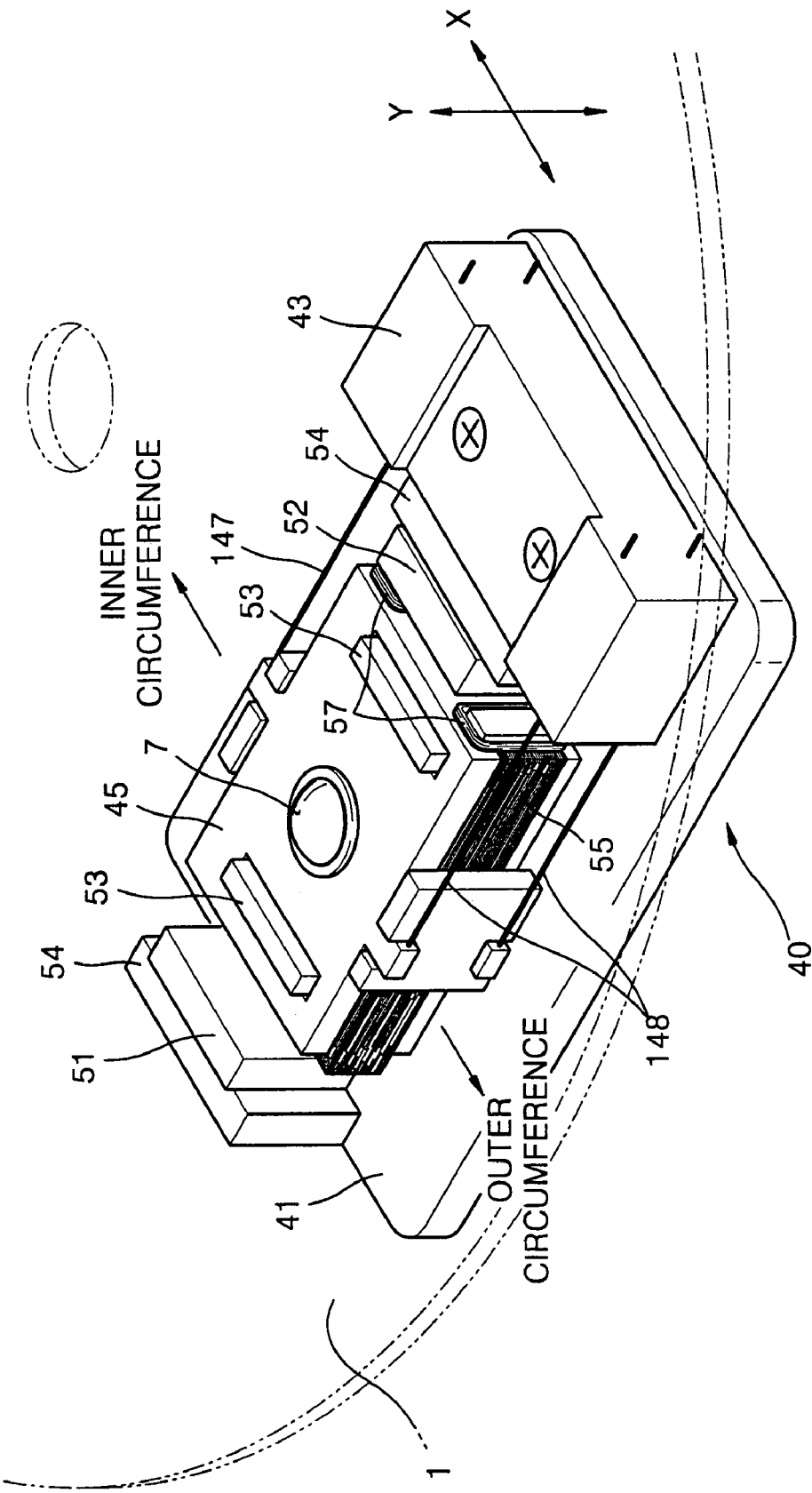
FIG. 14 is a schematic perspective view of an actuator of a CD-DVD compatible optical pickup according to an embodiment of the present invention.
Figure 15:
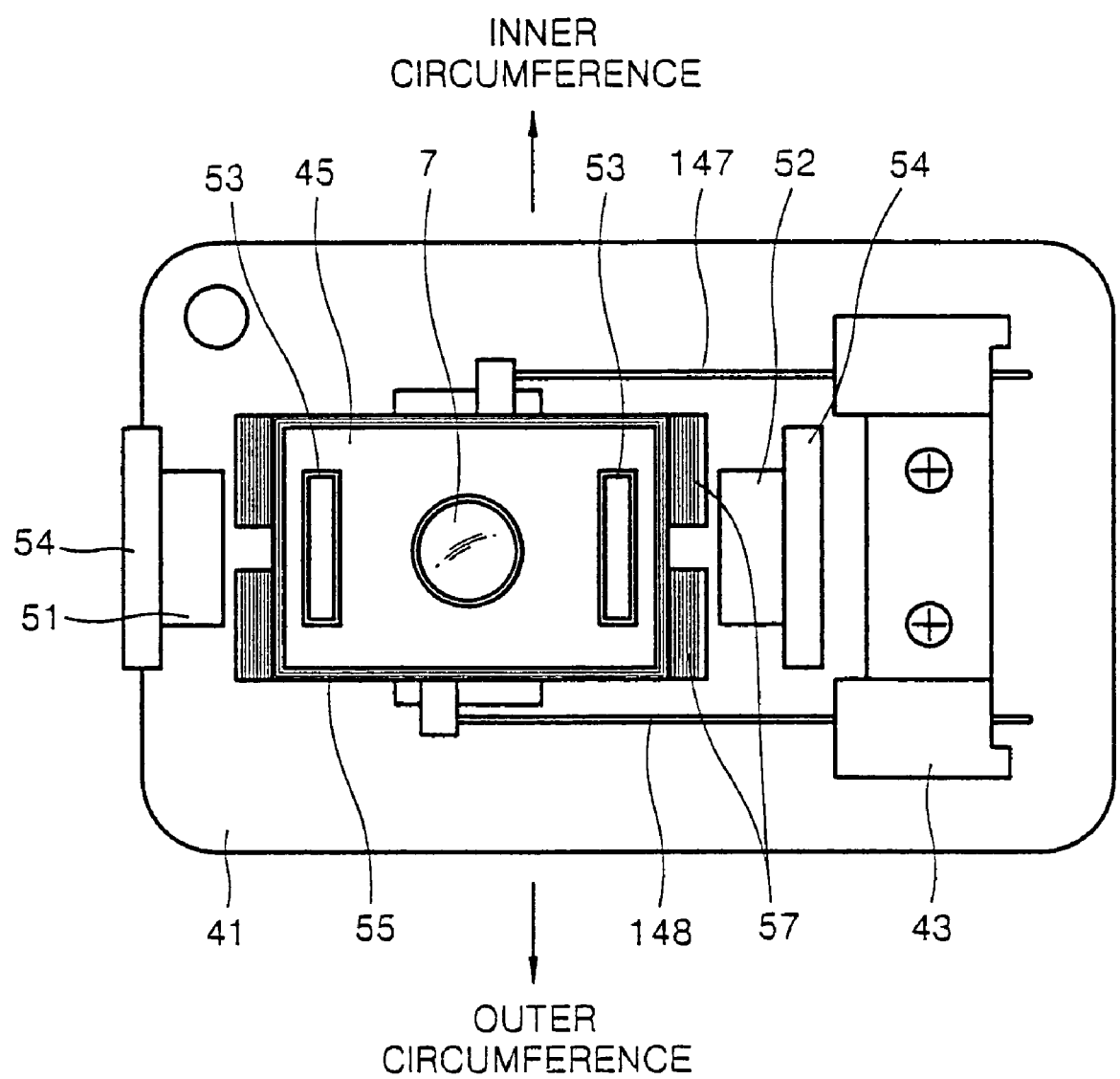
FIG. 15 is a plan view of the actuator of FIG. 14.

Referring to FIGS. 14 and 15, an actuator 40 according to an aspect of the present invention includes a base 41, a holder 43 installed on the base 41, and a moving member 45 in which an objective lens 7 is mounted. A plurality of elastic members 147 and 148 respectively having one end coupled to the holder 43 and the other end coupled to the moving member 45 such that the moving member 45 is supported movably. A magnetic driving unit drives the moving member 45 in a focusing direction (direction along a Y-axis in FIG. 14) and a tracking direction (direction along a X-axis in FIG. 14) of the optical recording medium 1. Structures of the elements, other than the elastic members 147 and 148, are as previously described.

The plurality of elastic members 147 and 148 include the first elastic member 147 positioned nearer an inner circumference, than an outer circumference, of the optical recording medium 1 with respect to the radius direction of the optical recording medium 1, and the second elastic member 148 positioned nearer an outer circumference, than an inner circumference, of the optical recording medium 1.

The deformation amounts of the first and second elastic members 147 and 148 are different from each other with respect to the center of the objective lens 7 such that the moving member 45 asymmetrically moves with respect to the focusing direction Y of the optical recording medium 1. To make the deformation amounts of the first and second elastic members 147 and 148 different from each other, according to an aspect of the present invention lengths of the first and second elastic members 147 and 148 are different from each other. The length of the second elastic member 148 is longer than that of the first elastic member 147 such that the second elastic member 148 deforms more than the first elastic member 147.

The deformation amount of the first and second elastic members 147 and 148 are determined with reference to Equations 1 through 7. The actuator 40 operates as previously described.

The deformation amounts of the first and second elastic members 147 and 148 can be set different from each other by using different materials for the first and second elastic members 147 and 148.

Figure 16:
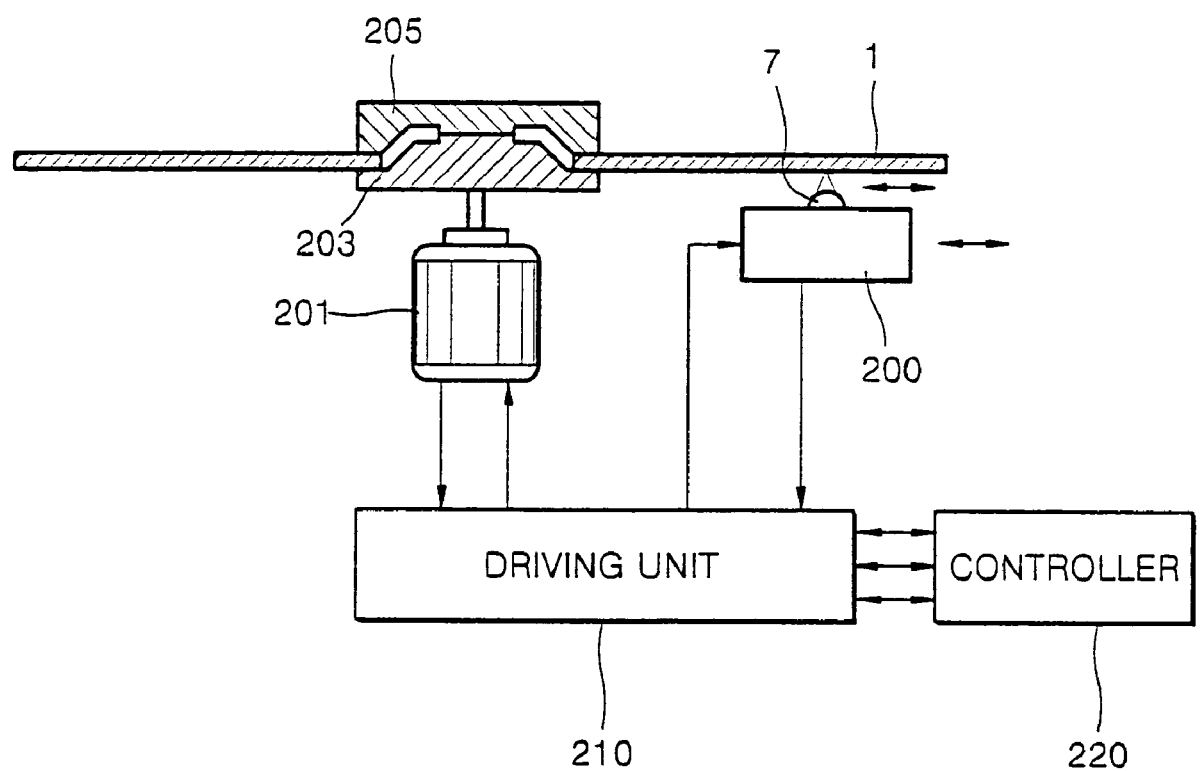
FIG. 16 shows an optical recording and/or reproducing apparatus using the CD-DVD compatible optical pickups according to an embodiment of the present invention.

Referring FIG. 16, an optical recording and/or reproducing apparatus using the CD-DVD compatible optical pickup according to an aspect of the present invention includes a turntable 203 accommodating a circular optical recording medium 1, a damper 205 fixing the optical recording medium 1, a spindle motor 201 rotating the optical recording medium 1. An optical pickup 200 is installed so as to be movable in a radius direction of the optical recording medium 1 performing recording and reproduction of data. A driving unit 210 drives the spindle motor 201 and the optical pickup 200, and a controller 220 controls a focusing servo and a tracking servo of the optical pickup 200.

The optical pickup 200 includes an optical unit including an objective lens 7 and an actuator driving the objective lens 7 in focusing and tracking directions of the optical recording medium 1. The structures and operations of the optical pickup and the actuator are as previously described.

A signal detected through the optical pickup 200 is converted and input to the controller 220 through the driving unit 210. The driving unit 210 controls the rotating speed of the spindle motor 201 and drives the optical pickup 200. The controller 220 sends a focusing servo instruction and a tracking servo instruction controlled based on the signal input from the driving unit 210 to the driving unit 210 performs as a focusing servo and a tracking servo.

As described above, a CD-DVD compatible optical pickup using a twin laser diode as a light source and an optical recording and/or reproducing apparatus using the same includes a first elastic member positioned close to an inner circumference of an optical recording medium with respect to the radius direction of the optical recording medium, and a second elastic member positioned close to an outer circumference of the optical recording medium. The deformation amounts of the first and second elastic members are different from each other. Further, it is determined whether a moving member is rolled using a magnetic driving unit. Thus, even if optical recording media of two types are used, particularly, thickness between an incident surface and a recording surface of the optical recording media of two types are different from each other, a substantially circular light spot, or a circle-like light spot, is formed on the optical recording media of two types.

Since a skew characteristic, according to an off-axis light, can be improved, an optical recording and/or reproducing apparatus can be improved. Further, the defective rate of the moving member due to the rolling thereof is reduced during manufacturing an optical pickup actuator, the defective rate of the actuator is reduced and a jitter characteristic is improved in the optical pickup, thereby increasing the productivity of the optical pickup.

Although a few embodiments of the present invention have been shown and described, it would be appreciated by those skilled in the art that various may be made in this embodiment without departing from the principles and spirit of the invention, the scope of which is defined in the claims and their equivalents.

What is claimed is:

1. A CD-DVD compatible optical pickup, comprising:
an optical output module having a mount and first and second light sources, positioned adjacent to each other on the mount emitting light beams having different wavelengths;
an objective lens focusing light emitted from the first and second light sources onto two types of optical recording media;
an optical path conversion unit positioned on an optical path between the optical output module and the objective lens, converting a traveling path of incident light;
a photodetector receiving the light beams emitted from the first and second light sources, reflected from the optical recording media, and passed through the optical path conversion unit, detecting a data signal and an error signal; and
an actuator having a movable member in which the objective lens is installed, moving the objective lens in a direction to compensate a focusing error signal and a tracking error signal, the actuator rolling the movable member, in a case where recording and/or reproduction of data is performed, using a light beam deviated from a main axis of the objective lens among the light beams emitted from the first and second light sources,
wherein the actuator includes:
a base on which the optical output module, the optical path conversion unit, and the photodetector are installed;
a holder installed on the base;
a plurality of elastic members, each having one end coupled to the holder and another end coupled to the moving member such that the movable member is supported movably, the length of the elastic member positioned nearer an inner circumference of the optical recording media with respect to the radius direction of the optical recording medium being different from that of the elastic member positioned nearer an outer circumference of the optical recording medium such that the movable member asymmetrically moves in a focusing direction of the optical recording media; and
a magnetic driving unit driving the movable member in the focusing direction and a tracking direction of the optical recording media by an electromagnetic force.

2. The CD-DVD compatible optical pickup of claim 1, wherein the actuator includes:
a plurality of elastic members, each having one end coupled to the holder and another end coupled to the movable member such that the movable member is supported movably, and having different stiffness with respect to the center of the objective lens such that the movable member asymmetrically moves in a focusing direction of the optical recording media; and
a magnetic driving unit driving the movable member in the focusing direction and a tracking direction of the optical recording media due to an electromagnetic force of the magnetic driving unit.

3. The CD-DVD compatible optical pickup of claim 2, wherein the stiffness of the elastic member positioned nearer an inner circumference of the optical recording media, with respect to the radius direction of the optical recording media, is different from that of the elastic member positioned nearer an outer circumference of the optical recording media due to a difference in thickness between the plurality of elastic members.

4. The CD-DVD compatible optical pickup of claim 2, wherein the stiffness of the elastic member positioned nearer the outer circumference is less than that of the elastic member positioned nearer the inner circumference.

5. The CD-DVD compatible optical pickup of claim 2, wherein the magnetic driving unit includes:
focusing coils and tracking coils installed on the moving member; and
a magnet generating the electromagnetic force driving the movable member in the focusing direction and the tracking direction of the optical recording media due to an interaction between the magnet and a current flowing in the focusing coils, and an interaction between the magnet and a current flowing in the tracking coils.

6. The CD-DVD compatible optical pickup according to claim 2, wherein the electromagnetic force suppresses the actuator rolling the movable member.

7. The CD-DVD compatible optical pickup of claim 1, wherein the length of the elastic member positioned nearer the outer circumference is longer than that of the elastic member positioned nearer the inner circumference.

8. The CD-DVD compatible optical pickup of claim 1, wherein the magnetic driving unit includes:
focusing coils and tracking coils installed on the moving member; and
a magnet driving the movable member in the focusing direction and the tracking direction of the optical recording media due to an interaction between the magnet and a current flowing in the focusing coils, and an interaction between the magnet and a current flowing in the tracking coils.

9. The CD-DVD compatible optical pickup according to claim 1, wherein the light reflected from a CD is on-axis light and light reflected from a DVD is off-axis light.

10. The CD-DVD compatible optical pickup according to claim 1, wherein the light reflected from a CD is off-axis light and light reflected from a DVD is on-axis light.

11. The CD-DVD compatible optical pickup according to claim 1, wherein the actuator rolling the movable member forms a substantially circular spot on at least one of the two types of optical recording media.

12. The CD-DVD compatible optical pickup according to claim 1, wherein an adjustment in an angle of inclination of the movable member forms a substantially circular spot on at least one of the two types of optical recording media.

13. An optical recording and/or reproducing apparatus, comprising:
a spindle motor rotating an optical recording medium positioned in a turntable;
an optical pickup installed to be movable in a radius direction of the optical recording medium and performing recording and/or reproduction of data with respect to the optical recording medium;
a driving unit driving the spindle motor and the optical pickup; and
a controller controlling a focusing servo and a tracking servo of the optical pickup, wherein the optical pickup includes:
an optical output module having a mount and first and second light sources positioned adjacent to each other on the mount emitting light beams having different wavelengths;

an objective lens focusing light emitted from the first and second light sources onto two types of optical recording media;

an optical path conversion unit disposed on an optical path between the optical output module and the objective lens, converting a traveling path of incident light;

a photodetector receiving the light beams emitted from the first and second light sources, reflected from the optical recording media, and passed through the optical path conversion unit, and detecting a data signal and an error signal; and an actuator having a movable member in which the objective lens is installed, and moving the objective lens in a direction to compensate a focusing error signal and a tracking error signal, the actuator rolling the movable member in a case where recording and/or reproduction of data is performed, using a light beam deviated from a main axis of the objective lens among the light beams emitted from the first and second light sources, wherein the actuator includes:
a base on which the optical output module, the optical path conversion unit, and the photodetector are installed;
a holder installed on the base;
a plurality of elastic members, each having one end coupled to the holder and another end coupled to the moving member such that the movable member is movably supported, the length of the elastic member positioned nearer an inner circumference of the optical recording media with respect to the radius direction of the optical recording medium being different from that of the elastic member positioned nearer an outer circumference of the optical recording medium such that the movable member asymmetrically moves in a focusing direction of the optical recording media; and
a magnetic driving unit driving the movable member in the focusing direction and a tracking direction of the optical recording media by an electromagnetic force.

14. The optical recording and/or reproducing apparatus of claim 13, wherein the actuator includes:
a plurality of elastic members, each having one end coupled to the holder and another end coupled to the moving member such that the movable member is supported movably, and having different stiffness with respect to the center of the objective lens such that the movable member asymmetrically moves in a focusing direction of the optical recording media; and
a magnetic driving unit driving the movable member in the focusing direction and a tracking direction of the optical recording media due to an electromagnetic force of the magnetic driving unit.

15. The optical recording and/or reproducing apparatus of claim 14, wherein the stiffness of the elastic member positioned nearer an inner circumference of the optical recording media with respect to the radius direction of the optical recording media is different from that of the elastic member positioned nearer an outer circumference of the optical recording media due to a difference in thickness between the plurality of elastic members.

16. The optical recording and/or reproducing apparatus of claim 14, wherein the stiffness of the elastic member positioned nearer the outer circumference is less than that of the elastic member positioned nearer the inner circumference.

17. The optical recording and/or reproducing apparatus of claim 14, wherein the magnetic driving unit includes:
focusing coils and tracking coils installed on the movable member; and
a magnet generating the electromagnetic force for driving the movable member in the focusing direction and the tracking direction of the optical recording media due to an interaction between the magnet and a current flowing in the focusing coils, and an interaction between the magnet and a current flowing in the tracking coils.

18. The optical recording and/or reproducing apparatus of claim 13, wherein the length of the elastic member positioned nearer the outer circumference is longer than that of the elastic member positioned nearer the inner circumference.

19. The optical recording and/or reproducing apparatus of claim 13, wherein the magnetic driving unit includes:
focusing coils and tracking coils which are installed on the movable member; and
a magnet generating the electromagnetic force driving the movable member in the focusing direction and the tracking direction of the optical recording media due to an interaction between the magnet and a current flowing in the focusing coils, and an interaction between the magnet and a current flowing in the tracking coils.

20. An actuator for a CD-DVD compatible optical pickup, comprising:
an objective lens focusing light emitted from first and second light sources onto two types of optical recording media;
a movable member, in which the objective lens is installed, moving the objective lens in a direction to compensate a focusing error signal and a tracking error signal according to a light beam deviated from a main axis of the objective lens among light beams emitted from the first and second light sources;
first and second elastic members, each having one end coupled to a holder and another end coupled to the movable member, and having a different property with respect to the center of the objective lens such that the movable member is asymmetrically movable in a focusing direction; and
a magnetic driving unit driving the movable member in the focusing direction and a tracking direction of the optical recording media due to an electromagnetic force of the magnetic driving unit,
wherein the different property is a different length of the second elastic member positioned nearer the outer circumference with respect to the radius direction of the optical recording media, from that of the first elastic member positioned nearer an outer circumference of the optical recording media.

21. The actuator for the CD-DVD compatible optical pickup according to claim 20, wherein the different property is a different stiffness, due to a difference in thickness of the first elastic member positioned nearer an inner circumference of the optical recording media, with respect to the radius direction of the optical recording media, from that of the second elastic member positioned nearer an outer circumference of the optical recording media.

22. The actuator for the CD-DVD compatible optical pickup according to claim 21, wherein the stiffness of the second elastic member is less than that of the first elastic member.

23. The actuator for the CD-DVD compatible optical pickup according to claim 20, wherein the length of the second elastic member is longer than that of the first elastic member.

24. A method of compensating for focusing and tracking errors during reproduction and recording with a CD-DVD compatible optical pickup, comprising: receiving and monitoring light emitted from a first and a second light source onto an optical recording medium; detecting a focusing error using an astigmatic method; detecting a tracking error by one of the three-light beam method or a differential phase detection method; deforming first and second elastic members, each having one end coupled to a movable member having an objective lens and another end coupled to a holder, wherein the first elastic member is deformed a different amount than the second elastic member; and moving the movable member asymmetrically in a focusing direction due to the different deformations of the first and second elastic members, wherein a length of the first elastic member positioned nearer an inner circumference of the optical recording media is different than that of the second elastic member positioned nearer an outer circumference of the optical recording media.

25. The method according to claim 24, wherein the moving the movable member is suppressed by an electromagnetic force.

26. An actuator for a CD-DVD compatible optical pickup, comprising: an objective lens focusing light emitted from first and second light sources onto two types of optical recording media differing in thickness; a movable member, in which the objective lens is installed, moving the objective lens in a direction to compensate a focusing error signal and a tracking error signal, according to the difference in thickness of the optical recording media; and first and second elastic members, each having one end coupled to a holder and another end coupled to the movable member, the length of the elastic member positioned nearer an inner circumference of the optical recording media with respect to the radius direction of the optical recording medium being different from that of the elastic member positioned nearer an outer circumference of the optical recording medium such that the movable member is asymmetrically movable in a focusing direction.

27. The actuator for the CD-DVD compatible optical pickup according to claim 26, wherein the moving is suppressed by an electromagnetic force of a magnetic driving unit.

* * * * *

UNITED STATES PATENT AND TRADEMARK OFFICE
CERTIFICATE OF CORRECTION

| | |
|---|---|
| PATENT NO. | : 7,254,098 B2 |
| APPLICATION NO. | : 10/677731 |
| DATED | : August 7, 2007 |
| INVENTOR(S) | : Jung-gug Pae et al. |

It is certified that error appears in the above-identified patent and that said Letters Patent is hereby corrected as shown below:

Column 11, Line 55, change "stiffness" to --stiffnesses--.

Column 13, Line 48, change "stiffness" to --stiffnesses--.

Signed and Sealed this

Eighteenth Day of December, 2007

JON W. DUDAS
*Director of the United States Patent and Trademark Office*